March 3, 1936.  W. W. ODELL  2,032,432
APPARATUS FOR DISPENSING LIQUIDS
Filed Aug. 31, 1931  2 Sheets-Sheet 1
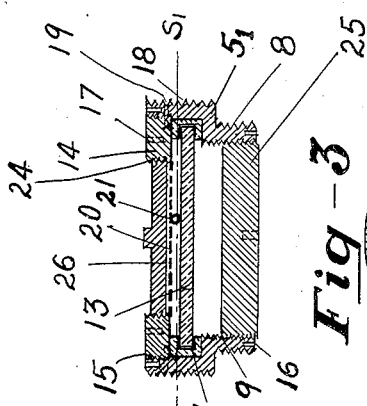
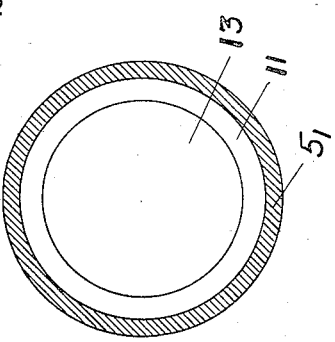
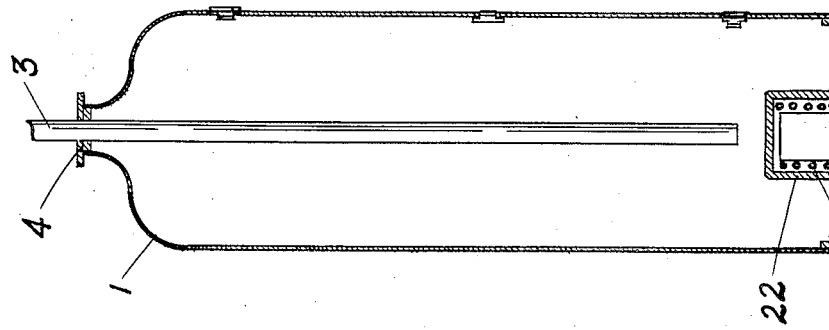
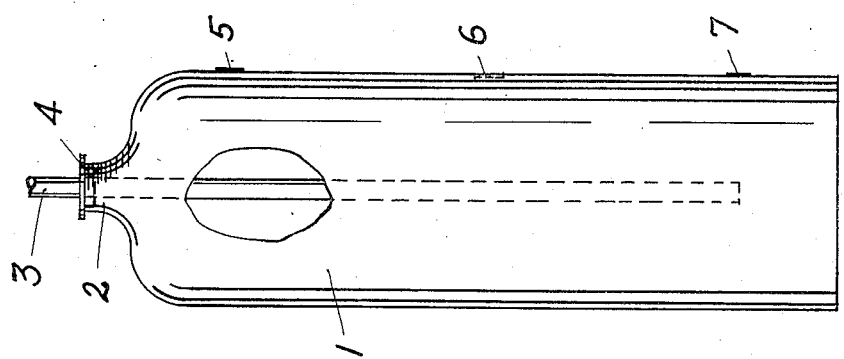
William W. Odell
INVENTOR

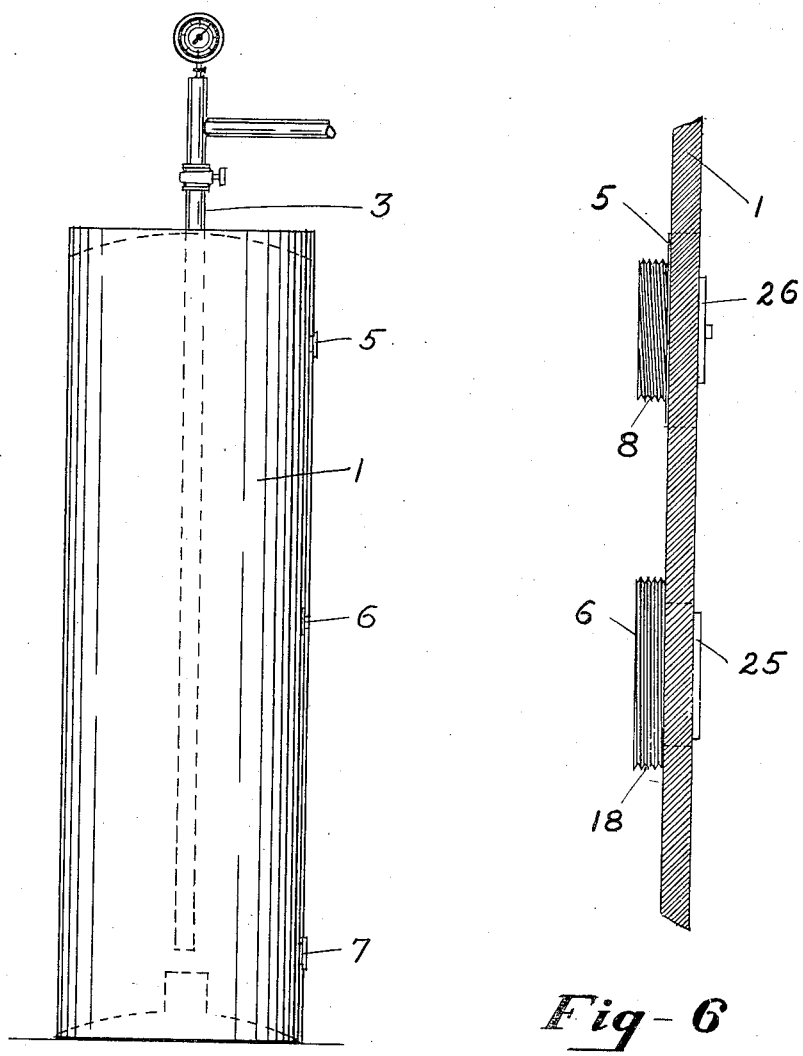

Patented Mar. 3, 1936

2,032,432

UNITED STATES PATENT OFFICE 2,032,432

APPARATUS FOR DISPENSING LIQUIDS

William W. Odell, New York, N. Y.

Application August 31, 1931, Serial No. 560,269

8 Claims. (Cl. 220—3)

My invention relates to a means of confining liquid fuels such as butane, natural gasoline, pentane, alcohols or other combustible fluid, some of which in the confined state are commonly referred to as "bottled gas". More particularly the invention relates to the means of determining the amount of liquid in the container when full, partly full or substantially empty. It is understood that the socalled "bottles" used for confining such liquids are normally made of metal and that the commonly employed method of determining their volume contents is by weighing them, deducting the tare from the gross weight and computing from the volume-weight relation the net amount of fuel contained therein.

One of the objects of my invention is to facilitate the determination of the liquid contents of a container having an opaque wall (for example a metal wall) without moving said container. Other objects will become evident from the disclosures herein made.

I find that in present practice in distributing "bottled gas" it is customary to weigh the container in order to determine how much liquid is left therein before recharging it. This results in considerable unnecessary labor and unnecessary "weighings". For the purpose of obviating this difficulty I provide a means for visibly determining the liquid level. Briefly the means comprise sight holes having glass or other transparent disks located in a countersunk position at especially provided points on the surface of the container. The disks are of sufficient strength to withstand the necessary pressure and are protected against the stress and strain of the expansion and contraction of the metal occasioned by changes in atmospheric temperature.

Perhaps it is not new to put windows in vessels having opaque shells, but it is believed to be new to provide the combination of a plurality of countersunk, protected windows in a "bottle" adapted for distributing butane or other liquid fuel under super-atmospheric pressure; the windows being located at definite points with respect to the full, empty and intermediate levels of the liquid. It will be understood that this combination makes it possible for the distributor to determine at a glance whether or not a tank should be filled and it also enables the purchaser to readily determine the amount of his purchase as well as to know when the tank or "bottle" is empty and when it is full.

One form of apparatus depicting my invention is shown in Figure 1, which is a vertical elevation of a metal pressure tank commonly referred to as a "bottle" by the retail distributors of liquefied petroleum gas.

Figure 2 is a sectional view of a bottle as shown in elevation in Figure 1.

Figure 3 is sectional detail of the window adapted for use in pressure tanks, covering one form of my invention.

Figure 4 is a section through SS' of Figure 3.

Figure 5 is an elevation of a bottle with an ordinary tank top.

Figure 6 is a sectional view of a portion of the container wall with window and screw plug for closing same.

All of the figures are somewhat diagrammatic and the same system of numbering is used throughout.

In Figure 1, the "bottle" is shown at 1, with neck 2, discharge tube 3, neck piece 4, and windows 5, 6 and 7. A portion of the shell is torn away to show the interior in section.

In Figure 2, the bottle is shown in section but it will be noted that the window shown at 6 is screwed into shell 1 from within the tank. Obviously this is done before the bottom of the bottle is made integral with the wall. Although the window is considered by me to be in a countersunk position in this instance as well as when it is screwed in from without the bottle wall, it is recognized that this encompasses the broad interpretatiin of the meaning of the word. A heating element 23, not a usual appurtenance may or may not be included as a part of the bottle equipment.

In Figure 3, the window has outer shell $5_1$, threaded portions 8, 9, 15 and 18, packing 11, transparent member 13, anchor piece 14, holes at 16 and 17 for applying a special wrench to $5_1$ and 14 respectively, and a lock pin 19. A screen is shown at 20 and a ball float 21. With most liquids the screen and float are dispensed with, there being no difficulty in discerning the level of the liquid by looking through the transparent member 13. Plugs for closing window may be screwed into the threaded portions of the window using the specially provided threaded surfaces 9 and 24.

In Figure 6 the same system of numbering is employed as in the other figures, the same numerals designate like parts.

In an apparatus for handling and dispensing "bottled gas" or other liquid fuel it is essential that there be as few protruding parts as possible on the surface of the container; this is particularly true in dispensing liquids under high pressure, and when the protruding part is a window. The exposed portion of the window should be as nearly as possible flush with the outer surface of the container. I have provided means for accomplishing this result.

When the window as shown in Figure 3 is screwed into the threaded opening in a container as shown in Figures 1 and 2, the maximum amount of exposed surface of the transparent member 13 is provided per unit area of opening in container-wall when threads 8 are used. When thus screwed into place from within, it is possible to tighten the window into shell 1, after the bottom 22 is secured to the wall, by means of a wrench fitted into holes 16. Although the window may be screwed into the bottle by the use of threads 8 or 18 or it may be welded, I prefer to insert it into place from within using threaded surface 8.

In the distribution of bottled gas employing an offtake 3 such as is shown in Figures 1 and 2, it is common practice to fill the tank to a definite limit, which is usually prescribed by regulatory boards or commissions as the full capacity, and when the liquid is substantially all discharged the level is about on a line with the bottom of offtake 3. Windows are provided with my apparatus so located (in the bottle) that the "full-line" and "empty-line" are clearly apparent. A third window is advantageously employed located between the levels of the other two whereby it is discernable when a tank is approaching a state of emptiness.

I claim as my own the combination of a pressure bottle having windows countersunk at the levels corresponding with a full tank and an empty tank whereby it is readily discernable when a tank is full or empty. Furthermore, I claim the foregoing combination with a third window located at a level midway the other two, substantially as shown in the figures. The middle line of the lower window is substantially opposite the bottom of the offtake as shown in Figures 1 and 2. With other types of offtakes the bottom window is at the level of the liquid in the tank when it is considered to be empty. The top one is so located that the middle of the transparent member is substantially the level of the liquid when the tank is charged to full capacity.

Referring again to Figure 3, I claim as my own the novel features of design of the window including (a) the adaptation of a single window to different tanks having different size window sockets, (b) ball float, (c) means for inserting it from within and tightening it from without the tank, and means for inserting a plug from without, contacting threads 9, closing the window when so desired.

The liquid fuel is discharged from the bottle shown in Figures 1 and 2 by virtue of its own vapor pressure or the pressure of another gas sparingly soluble in the liquid confined with it. The heating element is only used when it is desirable to employ fuel that may be cooled to a temperature at which its vapor pressure is less than one atmosphere and when it is desired to expel it substantially under its own vapor pressure. In present practice this feature is not employed by others so far as I am aware.

The offtake 3, shown in Figures 1 and 2 is used for charging the bottle, although a separate charging connection may be used if desired. There is less occasion for leakage when the offtake is used as charging inlet.

Having described my invention so that one skilled in the art can practice it, I claim:

1. In an apparatus for dispensing a volatile liquid fuel comprising a pressure-resisting container having means for receiving, confining and discharging said fuel as a liquid under superatmospheric pressure, an electric heating element separate from but forming a unit with said fuel reservoir located adjacent the bottom of said container adapted to supply heat to the confined liquid fuel, said heating element being external to said container being confined in a recessed chamber extending into said confined fuel.

2. In an apparatus for confining and dispensing a volatile liquid fuel under superatmospheric pressure the combination of, a reservoir for said fuel capable of withstanding high internal pressure having means for introducing said fuel therein, an offtake conduit communicating with the inside of said reservoir at substantially the bottom thereof adapted to conduct the liquid fuel from substantially the bottom of said reservoir, and an electric heating element located adjacent the bottom but external to the wall of said reservoir adjacent said offtake conduit adapted to supply heat to said fuel when said reservoir is charged therewith forming a unit with said reservoir.

3. In an apparatus for confining and dispensing a liquid fuel under superatmospheric pressure, the combination of, a liquid-fuel confining-container capable of withstanding high internal pressure having means for charging it with said liquid fuel, a discharge conduit communicating with the interior of said container at substantially the bottom thereof, and a heating element external to said container disposed adjacent the bottom thereof, said container having a recess in its lower portion adjacent the bottom forming a chamber, said heating element being confined in said chamber.

4. In an apparatus for confining and dispensing a liquid fuel under superatmospheric pressure, the combination of, a liquid-fuel confining-container capable of withstanding high internal pressure having means for charging it with said liquid fuel, a discharge conduit communicating with the interior of said container at substantially the bottom thereof, a heating element external to said container disposed adjacent the bottom thereof, and means for visibly determining the level of liquid in said container when it is charged therewith, said container having a recess in its lower portion adjacent the bottom forming a chamber, said heating element being confined in said chamber forming a unit with said reservoir.

5. An apparatus for confining and dispensing liquid fuel under superatmospheric pressure, comprising, the combination of a closed, pressure-resisting, liquid-fuel reservoir having an inlet for liquid fuel and outlet means for discharging liquid fuel from substantially the bottom thereof under the vapor pressure of said fuel, which outlet means comprises an offtake conduit extending down into said reservoir from substantially the top communicating with the interior at substantially the bottom thereof, and a means for maintaining the vapor pressure of said fuel, when confined therein, greater than atmospheric pressure which means comprises an electric heating element located adjacent both the bottom of said reservoir and the lower end of said offtake conduit but external to said reservoir forming substantially a unit with said reservoir.

6. An apparatus for confining and dispensing liquid fuel under superatmospheric pressure, comprising, the combination of a closed, pressure-resisting, liquid-fuel reservoir having means for charging liquid fuel thereto and means for discharging liquid fuel from substantially the bottom thereof under its own vapor pressure, and an electric heating element adapted to supply heat to said fuel when said fuel is confined therein, said reservoir having a re-entrant bottom confining said element.

7. In an apparatus for confining and dispensing liquid fuel under superatmospheric pressure comprising a closed, liquid-fuel reservoir having means for charging liquid fuel thereto and discharging liquid fuel from substantially the bottom thereof, a liquid-fuel-supply tank having a recessed chamber adjacent the bottom thereof confining an electric heating element which element is adapted to supply heat to the contents of said reservoir.

8. In a fuel dispensing apparatus which apparatus is a liquid-fuel package, the combination of a pressure resisting bottle confining a volatile liquid fuel, having a discharge pipe for removing the confined fuel under superatmospheric pressure from substantially the bottom of said bottle, and an electric heating element externally located adjacent the bottom of said bottle for heating the confined fuel, said element when connected in an electric circuit being adapted to supply sufficient heat to said fuel to raise its vapor pressure above atmospheric pressure.

WILLIAM W. ODELL.